US006266779B1

(12) United States Patent
Kurd

(10) Patent No.: US 6,266,779 B1
(45) Date of Patent: *Jul. 24, 2001

(54) CLOCK ENABLE GENERATION, SYNCHRONIZATION, AND DISTRIBUTION

(75) Inventor: Nasser A. Kurd, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,278

(22) Filed: Oct. 8, 1998

(51) Int. Cl.[7] ................................. G06F 1/04; G06F 1/12
(52) U.S. Cl. ............................................ 713/500; 713/400
(58) Field of Search .................................. 713/501, 502, 713/400, 401, 503, 500

(56) References Cited

U.S. PATENT DOCUMENTS

| 4,375,639 | * | 3/1983 | Johnson | 340/825.5 |
| 4,447,870 | * | 5/1984 | Tague et al. | 364/200 |
| 5,537,581 | * | 7/1996 | Conary et al. | 395/550 |
| 5,634,116 | * | 5/1997 | Singer | 713/400 |
| 5,758,131 | * | 5/1998 | Taylor | 395/552 |
| 5,796,995 | * | 9/1998 | Nasserbakht et al. | 395/558 |
| 5,834,956 | * | 11/1998 | Pathikonda et al. | 327/116 |
| 5,862,373 | * | 1/1999 | Pathikonda et al. | 713/501 |
| 6,009,532 | * | 1/2000 | Self | 713/400 |
| 6,112,308 | * | 8/2000 | Self et al. | 713/400 |

* cited by examiner

Primary Examiner—William Grant
Assistant Examiner—Ronald D Hartman, Jr.
(74) Attorney, Agent, or Firm—Blakely, Sokoloff, Taylor & Zafman LLP

(57) ABSTRACT

According to one embodiment, a clock enable generator circuit comprises a decode module configured to generate enable pulses. The decode module generates the enable pulses in response to receiving a clock ratio signal. The clock enable generator circuit further includes a first and second output circuit. The first output circuit is coupled to the decode module and is configured to generate a first set of clock enables in response to receiving an enable pulse from the decode module. The second output circuit is coupled to the decode module and is configured to generate a second set of clock enables. The clock enable generator circuit is configured to generate different sets of clock enables for each of a plurality of clock ratio signals. According to a further embodiment, The clock enable generator circuit further comprises a third output circuit coupled to the decode module. The first output circuit generates the first set of clock enables in response to the decode module receiving an even ratio signal. In addition, the first and third output circuits generate the first set of clock enables in response to the decode module receiving an odd ratio signal.

20 Claims, 7 Drawing Sheets

US 6,266,779 B1

CLOCK ENABLE GENERATION, SYNCHRONIZATION, AND DISTRIBUTION

FIELD OF THE INVENTION

The present invention relates to the field of clock generation; more particularly, the present invention relates to generating ratioed clock enable signals.

BACKGROUND OF THE INVENTION

Computer systems are generally divided into a group of components. These components are typically driven by a system clock carrying a signal of a predetermined frequency. The system clock is distributed to the various components within the computer system to provide a timing reference. The phases of the clock signal are used for sequencing logic in integrated circuits, and is provided to various components in the computer system. Due to advanced silicon technology, modern microprocessors are capable of operating at much higher frequencies than other components within the computer system. In fact, in order to provide high performance computer systems, it is often advantageous to operate the microprocessor(s) at its highest possible frequency and other parts of the computer system at a lower frequency dictated by various technology constraints.

In many microprocessors clock signals are generated by a core clock. The core clock is typically synthesized as a multiple of the system clock by the use of a clock synthesizer (e.g., phased locked loop). The synthesizer multiplies the system clock by an N factor. The core clock is subsequently distributed throughout the microprocessor core. After a core clock signal is distributed, it is fed back to the clock synthesizer and divided by the same N factor in order to synchronize the core clock to the system clock. Therefore, various prior art microprocessors are capable of operating at an integer multiple of the frequency of the system clock, while other devices operate at the system clock frequency.

In such a computer system, synchronous data transfer between components operating at different frequencies is facilitated by the fact that a data transfer edge of the lower frequency clock corresponds to a data transfer edge of the higher frequency clock. For example, if a component is limited to 50 MHz operation, then microprocessors operating at 100, 150, 200, . . . MHz can be used in an integer multiple design. Therefore, the data transfer edge of the lower frequency clock (and/or corresponding data transfer edges of the higher frequency clock) can be used to cause synchronous data transfer.

Some prior art systems must generate more than a simple 1/N system clock to core ratio. Such prior art systems support 2/N ratios, where N may vary from 4 to 15. In the 2/N ratio scheme, N core clock cycles are generated for every two system clock cycles. Many 2/N ratio systems also use a ratioed clock. A ratioed clock is derived from the core clock by selecting specific edges of the core clock to generate the desired ratio. In order to generate the ratioed clock, enable signals must be generated for each cycle.

One problem with the prior art 2/N mode ratioed clock generation scheme is that a ratioed clock enable generation circuit must be designed for each particular ratio. Alternatively, additional circuitry must be provided for multiple ratio implementation.

Another problem with prior art systems is that ratioed clock enable signals are generated in a central location and must be globally routed across the microprocessor to each component of the system bus. Enable signals may switch at fairly high frequencies. High frequency switching signals that must be distributed along long global lines consume a considerable amount of power. In addition, routing long enable lines that switch at high frequencies may also couple noise into other signals that may be in close proximity to the enable signal. This phenomenon is typically referred to as crosstalk. Crosstalk may also occur when other signals couple noise into the enable signals, changing timing or inducing false enable pulses.

Therefore, a system and apparatus for generating and distributing ratioed clock enable signals for multiple integer ratio relationships is needed.

SUMMARY OF THE INVENTION

According to one embodiment, a clock enable generator circuit comprises a decode module configured to generate enable pulses. The decode module generates the enable pulses in response to receiving a clock ratio signal. The clock enable generator circuit further includes a first and second output circuit. The first output circuit is coupled to the decode module and is configured to generate a first set of clock enables in response to receiving an enable pulse from the decode module. The second output circuit is coupled to the decode module and is configured to generate a second set of clock enables. The clock enable generator circuit is configured to generate different sets of clock enables for each of a plurality of clock ratio signals.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for generating clock enable signals in a microprocessor is described. In the following detailed description of the present invention, numerous specific details are set forth, such as specific signal names, device frequencies, bus frequencies, frequency ratios, etc., in order to provide a thorough understanding of the present invention. However, it will be apparent to one of ordinary skill in the art that the present invention may be practiced without these specific details. In other instances, well-known structures and devices are shown in block diagram form, rather than in detail, so as not to obscure the present invention.

It is understood that the present invention may be comprised of transistor circuits that are readily manufacturable using well-known CMOS (complementary metal-oxide semiconductor) technology, or other equivalent semiconductor manufacturing processes. In addition, the present invention may be implemented with other manufacturing processes for making digital devices.

While in the following discussion the present invention is presented with respect to implementation in a microprocessor, the present invention is not limited to that implementation. Implementations for generating clock signals for various digital devices such as discrete logic devices, memory devices, devices either on the same or separate chips, communications devices, etc., are within the scope and spirit of the present invention.

Figure 1:
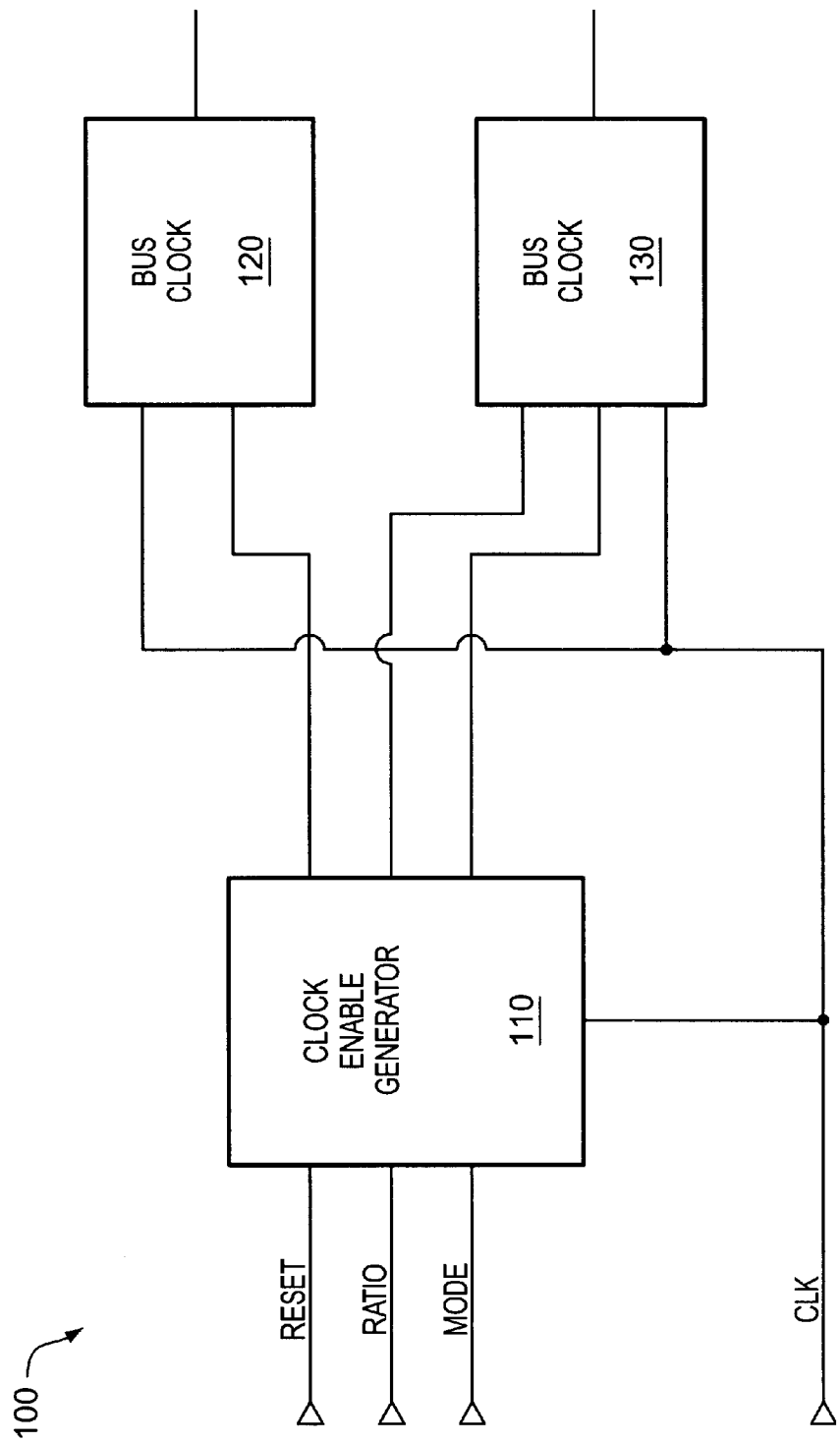
FIG. 1 is a block diagram of an embodiment of a microprocessor of the present invention.

FIG. 1 is a block diagram of the embodiment of a microprocessor 100 of the present invention. Referring to FIG. 1, microprocessor 100 includes a clock enable generator 110, and busclock macros 120 and 130. Busclock macros 120 and 130 generate clock signals upon receiving an enable signal from clock enable generator 110. According to one embodiment, busclock macro 130 is configured to generate clock signals at twice the frequency of busclock 120.

Clock enable generator 110 generates clock enable signals based upon programmed signals that are received over ratio input lines. The programmed ratio signals (RATIO) are generated by a ratio block (not pictured) that defines the number of core clock signals (CLK) to be received by clock enable generator 110 before generating a common clock enable signal. According to one embodiment, RATIO is a four bit binary number representing ratios of four through fifteen. For example, a binary 8 (1000) received by clock enable generator 110 over the ratio signal lines indicates that clock enable generator 110 will generate a common clock enable signal on every eighth core clock pulse. Accordingly, busclock macro 120 generates one common clock signal per eight core clock signals.

According to one embodiment, clock enable generator 110 is further configured to generate two clock enable signals per core clock signal received equal to the ratio value (i.e., 2/N, where N=RATIO, (or 2 times the common clock)). For example if RATIO=8, clock enable generator 110 may generate an enable signal per four core clock signals, in addition to the common clock. Consequently, busclock macro 130 will generate a clock signal on every fourth core clock pulse.

Clock enable generator 110 also receives a one bit mode signal (MODE) that indicates the mode of operation. According to one embodiment, clock enable generator 110 operates in either a double or quad mode. For example, if MODE=0, clock enable generator 110 operates in the double mode. In the double mode, clock enable generator 110 operates as described above (i.e., generating clock enables for every N and 2/N core clocks, where N=RATIO). If MODE=1, clock enable generator 110 operates in the quad mode. In the quad mode, clock enable generator 110 generates clock enables for every N and 4/N core clocks, where N=RATIO. Thus, for RATIO=8, clock enable generator 110 would generate an enable signal every second core clock signal and another at every eighth core clock signal.

Clock enable generator 110 may also be configured to receive a RESET signal for initializing operation upon system startup, reset or any other synchronizing event. According to one embodiment, the RESET, RATIO and MODE signals are generated in other blocks of microprocessor 100 that are not the subject of the present invention. Nevertheless, one of ordinary skill in the art will appreciate that any combination of these signals could be generated within microprocessor 100.

Microprocessor 100 further includes a system bus (not shown). The system bus comprises a control bus, a data bus and an address bus. Each bus within the system bus is driven by a separate clock. According to one embodiment, the clock that drives the data bus operates at twice the speed of the clocks that drive the control and address busses while clock enable generator 110 is operating in the double mode (i.e., control clock=address clock=½ data clock). Accordingly, the clock generated by busclock macro 120 is configured to drive the control bus and address bus (i.e., common clock), and busclock macro 130 is configured to drive the data bus (2×common clock) while clock enable generator 110 is operating in the double mode.

According to a further embodiment, the data clock operates at four times the speed of the control clock and twice the speed of the address clock while clock enable generator 110 is operating in the quad mode (i.e., control clock=½ address clock=¼ data clock). In this embodiment, the control clock is generated by busclock macro 120, while the address and data clocks are generated by busclock macro 130. The generation of the bus clocks in the double and quad modes will be discussed in further detail below.

Figure 2:
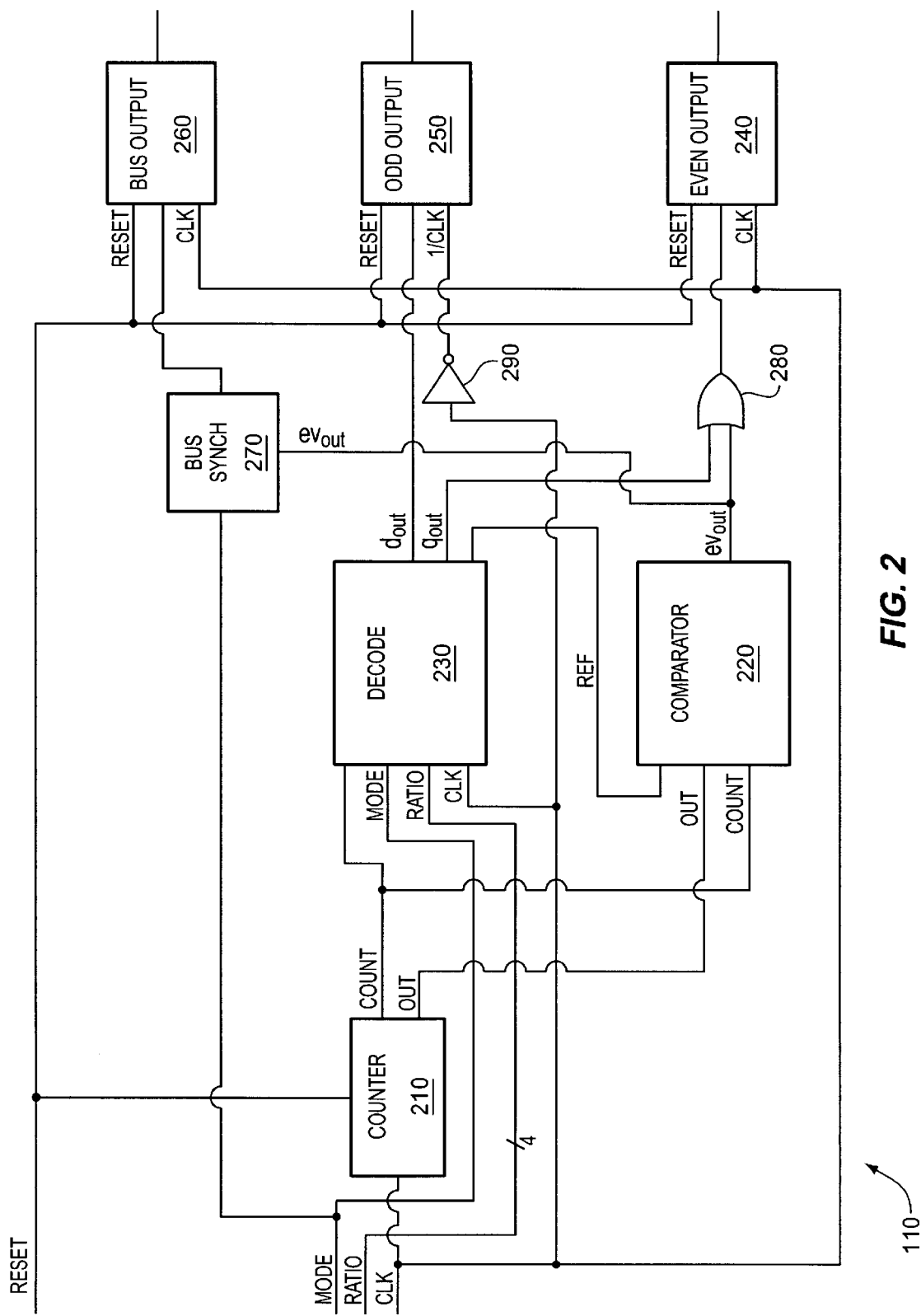
FIG. 2 illustrates a clock enable generator according to one embodiment of the present invention.

Referring to FIG. 2, one embodiment of clock enable generator 110 according to the present invention is illustrated. Clock enable generator 110 includes a counter 210, comparator 220, decode module 230, even output module 240, odd output module 250, bus output module 260, bus synch module 270, or-gate 280 and inverter 290. Counter 210 increments each time a core clock pulse is received. Counter 210 transmits a COUNT signal to comparator 220 and decode module 230 after each increment. According to one embodiment, COUNT is a four bit binary number corresponding to the number of core clock signals received at counter 210. Counter 210 also receives an OUT signal from comparator 220 in order to reset COUNT to zero. Counter 210 further receives the RESET signal for initialization upon system startup, reset or other synchronizing events.

Comparator 220 is coupled to counter 210 and decode module 230. Comparator 220 compares the COUNT signal received from counter 210 with a reference signal (REF) received from decode module 230. Once a match is detected between the COUNT and REF signals, a signal (EVOUT) is transmitted to or-gate 280 and bus synch module 270. Also, comparator 220 transmits an OUT signal to counter 210 upon a match between the COUNT and REF signals.

Decode module 230 is coupled to counter 210 and comparator 220. Decode module 230 generates clock enable signals based upon the received COUNT, RATIO and MODE signals. According to one embodiment, decode module 230 transmits a four-bit reference signal (REF) based upon the RATIO value. In addition, decode module 230 transmits a DOUT signal to odd output module 250, and a QOUT signal to or-gate 280.

Even output 240 is coupled to the output of or-gate 280 and receives clock enable signals for even ratios and transmits them to busclock macro 130. Odd output module 250 is coupled to decode module 230 and receives clock enable signals for odd ratios (i.e., the DOUT signal) and transmits them to busclock macro 130. Bus output module 260 is coupled to bus synch module 270 and receives clock enable signals and transmits them to busclock macro 120. Both even output module 240 and bus output module 260 transmit clock enable signals in synch with the core clock signal (CLK). Odd output module 250 is configured to transmit clock enable signals in synch with the inverse of the core clock signals (i.e., 1/CLK). Even output module 240, odd output module 250 and bus output module each receive the RESET signal for initialization upon system startup, reset or other synchronization event.

Figure 5:
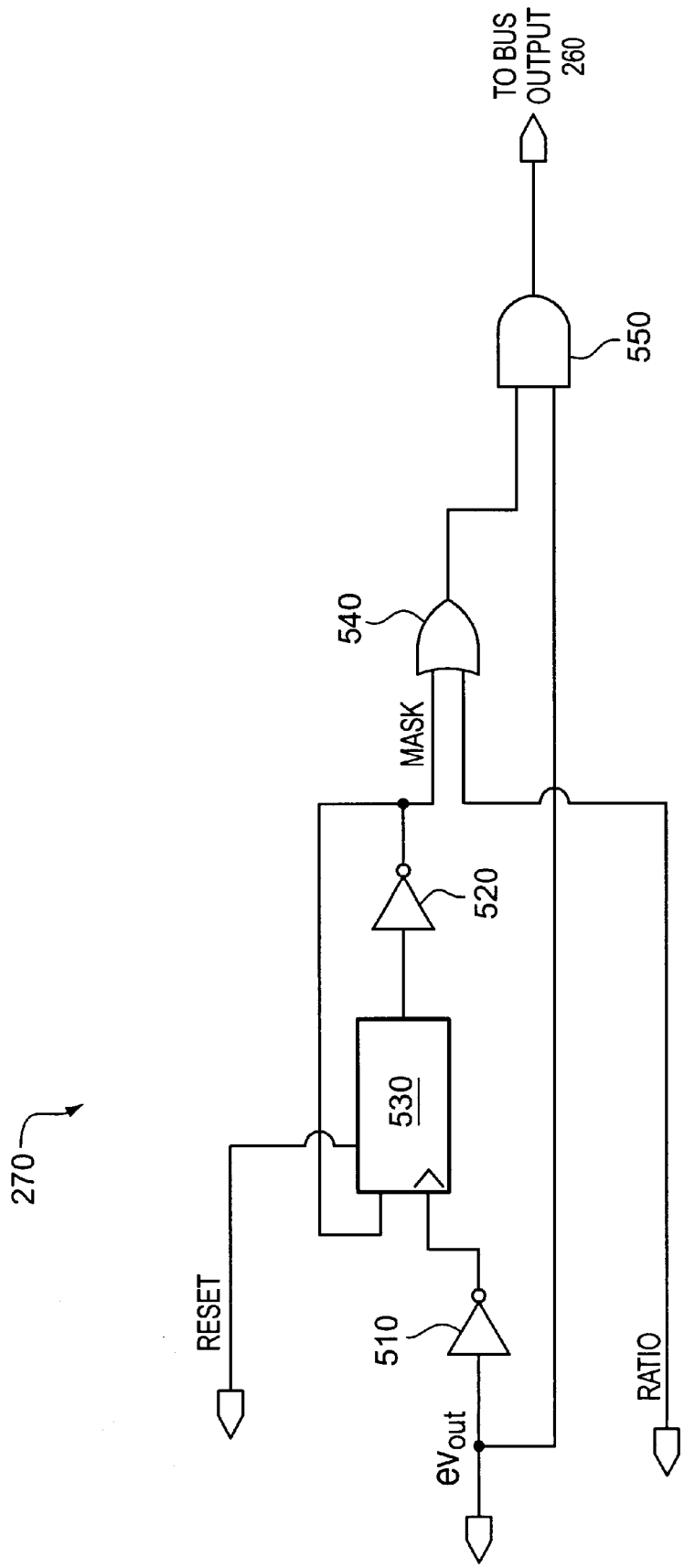
FIG. 5 illustrates a bus synch module 270 according to one embodiment of the present invention.

Bus synch module 270 is coupled to comparator 220 and decode module 230. Bus synch module 270 synchronizes common clock enable signals with the core clock. FIG. 5 illustrates a bus synch module 270 according to one embodiment of the present invention. Referring to FIG. 5, bus synch module 270 includes inverters 510 and 520, memory element 530, or-gate 540 and and-gate 550. According to one embodiment, memory element 530 is a flip-flop. However, one of ordinary skill in the art will recognize that other memory devices may be used to implement memory element 530.

Memory element 530 is coupled to comparator 220 and receives the EVOUT signal after it is inverted by inverter 510. Memory element 530 also receives the RESET signal for initialization upon system startup, reset or other synchronization events. Memory element 530 is further coupled to inverter 520. Inverter 520 is coupled or-gate 540 and memory element 530. Inverter 520 transmits a signal (MASK) to one input of or-gate 540. Inverter 520 also feeds back the MASK signal to memory element 530. Or-gate 540 also receives the least significant bit (or first bit) of the RATIO signal at the second input. Or-gate 540 is activated if MASK or RATIO, or both, are high (i.e., logical one). The output of or-gate 540 is coupled to one input of and-gate 550. The second input of and-gate 550 receives the EVOUT signal from comparator 220. And-gate 550 is activated if or-gate 540 and EVOUT is one. The output of and-gate 550 is coupled to bus output 260.

If the first bit is one, RATIO is odd and or-gate 540 is activated. Or-gate 540 transmits a signal to and-gate 550. And-gate 550 is subsequently activated each time EVOUT is transmitted. If the first bit is zero, RATIO is even, and does not activate or-gate 540. Thus, or-gate 540 may only be activated by MASK when RATIO is even. Each time the EVOUT signal is high, the previous value stored in memory element is inverted by inverter 520, transmitted to or-gate 540 and fed back to memory element as the MASK signal. Consequently, MASK activates or-gate 540 on every second EVOUT signal received. Whenever the MASK signal activates or-gate 540 at the same time the EVOUT signal is received, and-gate 550 is activated and transmits a signal to bus output 260.

Figure 3:
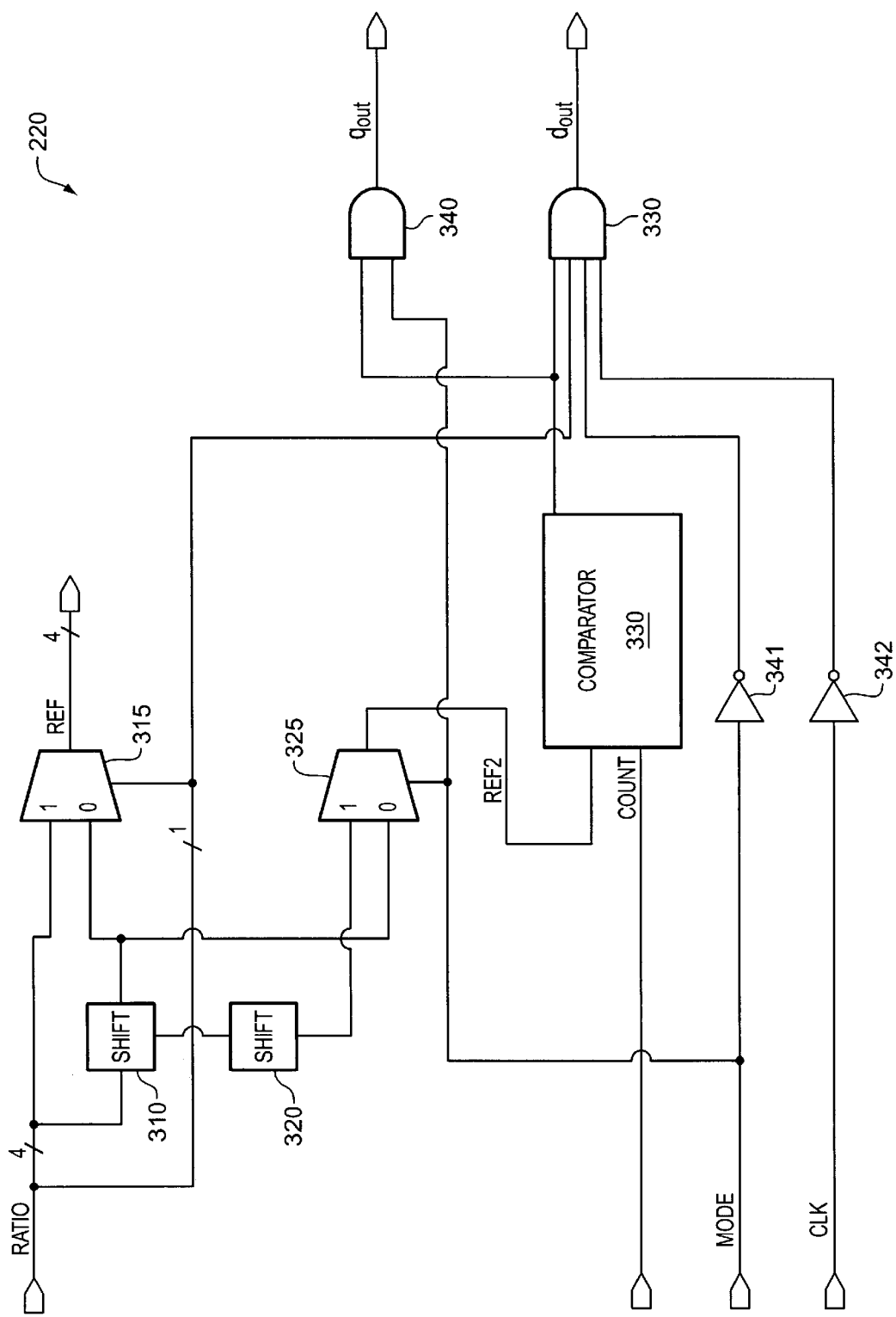
FIG. 3 illustrates one embodiment of a decode module according to the present invention.

FIG. 3 illustrates one embodiment of decode module 230 according to the present invention. Decode module 230 includes logical shift units 310 and 320, multiplexers 315 and 325, comparator 330, and-gates 340 and 350, and inverters 341 and 342. According to one embodiment, logical shift unit 310 receives the RATIO signal and shifts each bit to the right, while adding a zero into the most significant bit. Consequently, the least significant bit of RATIO is shifted out. For example, RATIO=8 (i.e., 1000) is converted into 4 (i.e., 0100) after being shifted by logical shift unit 310. Logical shift unit 310 transmits the shifted value to logical shift unit 320, and multiplexers 315 and 325. Logical shift unit 320 shifts the RATIO signal a second time (i.e., 0100 is converted to 0010 (2)). Logical shift unit 320 transmits the twice shifted value to multiplexer 325. In an alternative embodiment, the function of logical shift units 310 and 320 may be combined into one logical shift unit. However, one of ordinary skill in the art will recognize that logical shift units 310 and 320 may be implemented using various other techniques.

Multiplexer 315 selects the RATIO signal or the shifted signal based upon whether RATIO is odd or even. The selection is transmitted to comparator 220 as the REF signal. The select bit of multiplexer 315 receives the first bit of the RATIO signal. If the first bit is a zero, RATIO is even and the shifted value is transmitted as REF. If the first bit is one, RATIO is odd and RATIO is transmitted as REF. Multiplexer 325 selects the shifted RATIO signal or the twice shifted signal based upon the mode in which clock enable generator 110 is operating. The selection is transmitted to comparator 330 as a reference signal REF2. The select bit of multiplexer 325 receives the MODE signal. If clock enable generator 110 is operating in the double mode (i.e., MODE=0), the once shifted RATIO value is transmitted as REF2. If operating in the quad mode (i.e., MODE=1), the twice shifted value is transmitted as REF2. One of ordinary skill in the art will recognize that other devices may be used in place of multiplexers 315 and 325, and that other logic values may be used to enable or disable them.

Comparator 330 is coupled to counter 210 and multiplexer 325. Comparator 330 compares the COUNT signal received from counter 210 with REF2. Once a match is detected between the COUNT and REF2 signals, a signal is transmitted to and-gates 340 and 350.

And-gate 340 receives one input from the output of comparator 330 and the other from the MODE signal. And-gate 340 transmits the QOUT signal whenever the MODE signal and the output of comparator 330 are both high. And-gate 350 receives inputs from the output of comparator 330, the first bit of the RATIO signal, an inverted MODE signal and the inverted core clock. And-gate 350 is activated whenever the first bit of RATIO=1 (i.e., RATIO is odd), clock generator 110 is operating in double mode, comparator 330 detects a match and the core clock is in a low phase.

Upon startup of microprocessor 100, the RATIO and MODE signals are transmitted to clock enable generator 110. The RATIO signal is received by logical shift register 310, multiplexer 315 and and-gate 350 within decode module 230. The MODE signal is received by multiplexer 325, and-gate 340 and inverter 341. The MODE signal is also received by bus synch module 270. If clock enable generator 110 is operating in the double mode (i.e., MODE=0) and RATIO is even (e.g., 8), a binary 1000 is received at one input of multiplexer 315. In addition, a binary 0100 (shifted RATIO=4) is received at the second input of multiplexer 315. Since RATIO is even, multiplexer 315 selects the shifted value and transmits it to comparator 220 as the REF signal.

Comparator 220 compares the REF signal with the received COUNT signal. Upon a match between the REF and COUNT signals (e.g., 4), a signal is transmitted to or-gate 280 and bus synch module 270. As described above, the output of bus synch module 270 is activated on every second EVOUT signal received from comparator 220 whenever RATIO is even. The output of bus synch module 270 is transmitted to bus output module 260. Bus output module 260 transmits the clock enable to busclock macro 120. Accordingly, a clock pulse is generated by busclock macro 120 on every eighth core clock pulse for RATIO=8.

In addition, the signal received from comparator 220 activates or-gate 280 which, in turn, transmits a signal to even output module 240. Even output module 240 transmits a signal to busclock macro 130 on the next received core clock. After comparator 220 detects a match, the OUT signal is transmitted to counter 210 and COUNT is reset to zero and begins to recount. Thus, a clock pulse is generated by busclock macro 130 on every fourth core clock cycle for RATIO=8.

Comparator 330 operates similar to comparator 220 and transmits an output signal to and-gates 340 and 350 on every fourth core clock. However, since clock enable generator 110 is operating in the double mode, and-gate 340 is never activated. Thus, no QOUT signal is transmitted from decode module 220. According to one embodiment, the clock enables generated by bus output module 260 are used by busclock macro 120 to generate the control and address busses while clock enable generator 110 is operating in the double mode and the ratio is even. The clock enables generated by even output module 240 are used by busclock macro 130 to generate the data bus.

If clock enable generator 110 is operating in the quad mode (i.e., MODE=1), the operation of clock enable generator 110 with respect to multiplexer 315, comparator 220 and bus synch module 270 remains the same. However, a binary 0010 (twice shifted value=2) is received at comparator 330 from logical shift register 320 via multiplexer 325 (i.e., REF2). Comparator 330 compares the REF2 value with the COUNT signal. Upon a match (e.g., 2), a signal is transmitted to and-gates 340 and 350. And-gate 350 is never activated because the first bit of RATIO=0.

And-gate 340 transmits the QOUT signal to or-gate 280. Or-gate 280 transmits a signal to even output module 240. Even output module 240 transmits a signal to busclock macro 130 on the next received core clock. This process continues on every fourth core clock cycle when CLOCK=2 (note that COUNT is still reset when a match occurs at comparator 220). Busclock macro 130, however, generates a clock pulse on every second core clock cycle (e.g., COUNT=2 at comparator 330 and COUNT=4 at comparator 220).

According to one embodiment, the clock enables generated by bus output module 260 are used by busclock macro 120 to generate the control bus clock while clock enable generator 110 is operating in the quad mode. The clock enables generated by even output module 240 are used by busclock macro 130 to generate the data bus clock. In order to generate the address bus clock in the quad mode, a second clock enable generator 110 is necessary. The second clock enable generator 110 operates in the double mode, as described above, and receives the same ratio (e.g., 8). The clock enables generated by even output module 240 of the second clock enable generator are used by busclock macro 130 of the second clock enable generator 110 to generate the address bus.

If clock enable generator 110 is operating in the double mode and receives an odd RATIO (e.g., 9), a binary 1001 is received at one input of multiplexer 315. Since the first bit is odd, multiplexer 315 transmits RATIO to comparator 220 as the REF signal. Comparator 220 compares the REF signal with COUNT. Upon a match between the REF signal and COUNT (e.g., 9), a signal is transmitted to or-gate 280 and bus synch module 270. According to one embodiment, the output of bus synch module 270 is activated on every EVOUT signal received from comparator 220 whenever RATIO is odd.

In addition, the signal received from comparator 220 activates or-gate 280, which transmits a signal to even output module 240. Even output module 240 transmits a signal to busclock module 130 on the next received core clock. COUNT is reset to zero after comparator 220 detects a match. Thus, even output module 240 is activated on every ninth COUNT pulse for RATIO=9.

Further, comparator 330 receives the shifted value (REF2=0100) via multiplexer 325 due to the select bit receiving a zero value. Comparator 330 compares REF2 with COUNT. Upon a match (e.g., 4), an output signal is transmitted to and-gates 340 and 350. And-gate 340 is never activated since clock enable generator 110 is operating in the double mode. Thus, no QOUT signal is transmitted from decode module 230. And-gate 350 is activated on the following inverted core clock pulse. The output of and-gate 350 provides the DOUT signal. According to one embodiment, odd output module 250 is activated when DOUT and the core clock is low. Since it is activated by the inverse of the core clock, the clock enable generated by odd output module 250 is on the falling edge of the core clock. Consequently, for RATIO=9, the first clock enable generated by odd output is on the falling edge of the fourth core clock (e.g., 4.5).

This process continues on every ninth core clock cycle when CLOCK=4 (note that COUNT is only reset when a match occurs at comparator 220 (e.g., COUNT=9)). Nevertheless, busclock macro 130 generates a clock pulse on every four and one-half core clock cycles (e.g., COUNT= 4.5 at comparator 330 and COUNT=9 at comparator 220). According to one embodiment, the clock enables generated by bus output module 260 are used by busclock macro 120 to generate the clock for the control and address busses while clock enable generator 110 is operating in the double mode and the ratio is odd. The clock enables generated by even output module 240 and odd output module 250 are used by busclock macro 130 to generate the data bus clock.

Figure 4:
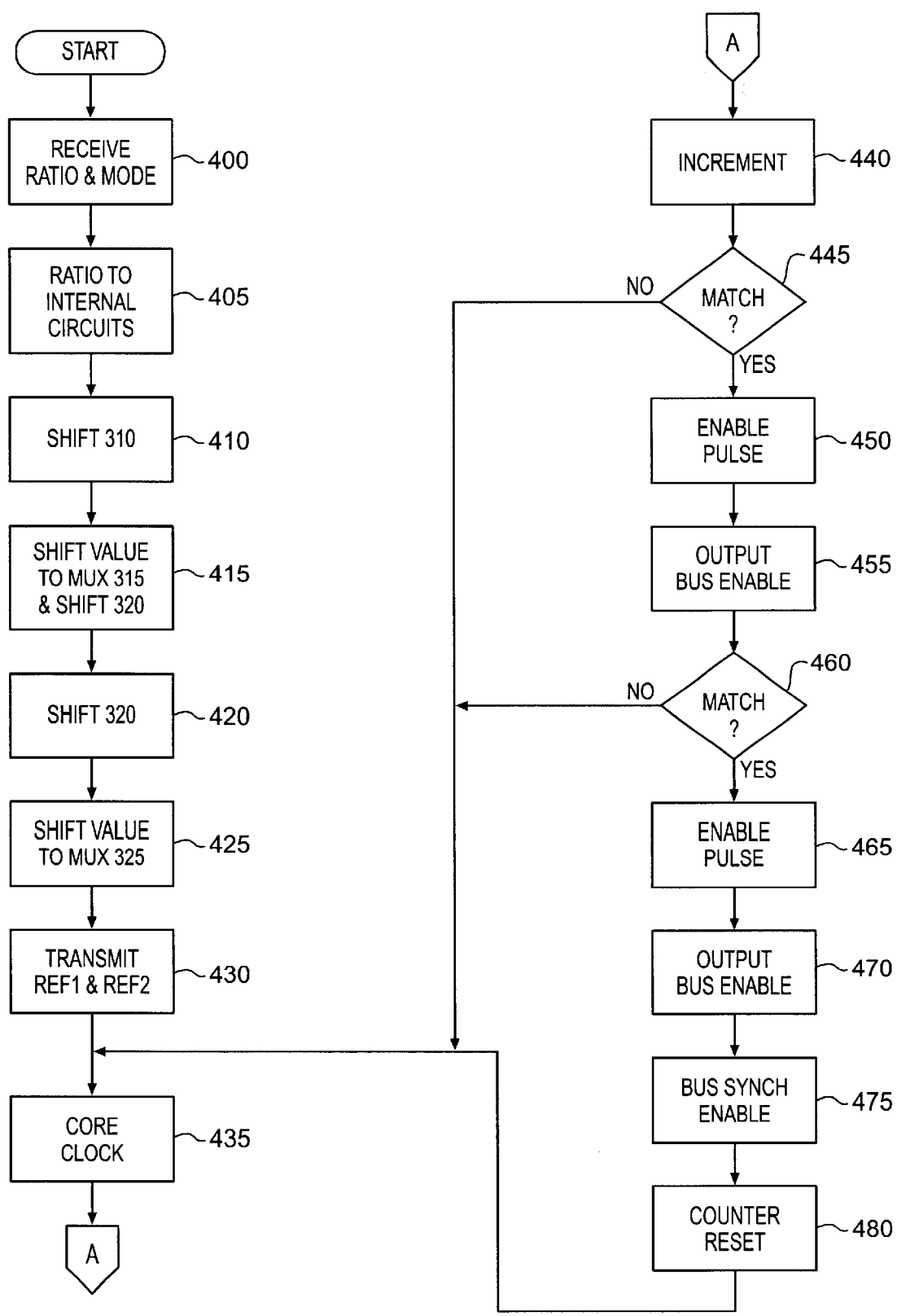
FIG. 4 illustrates a flow diagram for an embodiment of a procedure for generating bus enable signals.

FIG. 4 illustrates a flow diagram for an embodiment of a procedure for generating bus enable signals when clock enable generator 110 is operating the double mode and RATIO is odd. Referring to FIG. 4, the RATIO and MODE signals are received at clock enable generator 110, step 400. At step 405, RATIO is received at logical shift unit 310 and multiplexer 315. Next, logical shift unit 310 shifts the RATIO value, step 410. The shifted value is transmitted to multiplexer 315 and logical shift unit 320, step 415. At step 420, logical shift unit 320 shifts RATIO a second time. Next, the twice shifted value is transmitted to multiplexer 325, step 425. Subsequently, the RATIO value is transmitted from multiplexer 315 to comparator 220 as REF, and the shifted value is transmitted from multiplexer 325 to comparator 330 as REF2, step 430.

At step 435, a core clock pulse is received at clock enable generator 110. Next, the COUNT value is incremented, step 440. COUNT is then compared with REF2 at comparator 330, step 445. If there is no match between COUNT and REF2, control is transferred back to step 435 wherein a subsequent core clock pulse is received. If a match occurs, an enable pulse is transmitted to odd output module 250, step 450. Next, an enable signal is transmitted from even output module 250, step 455.

At step 460, COUNT is compared with REF at comparator 220. If there is no match between COUNT and REF, control is again transferred back to step 435 wherein a subsequent core clock pulse is received. If a match occurs, an enable pulse is transmitted to bus synch module 270 and even output module 240, step 465. Subsequently, an enable signal is transmitted from even output module 240, step 470. At step 475, an enable pulse is transmitted from bus synch module 270 to bus output module 260 where an enable signal is generated. Finally, counter 210 is reset and control is transferred to step 435, step 480.

Figure 6:
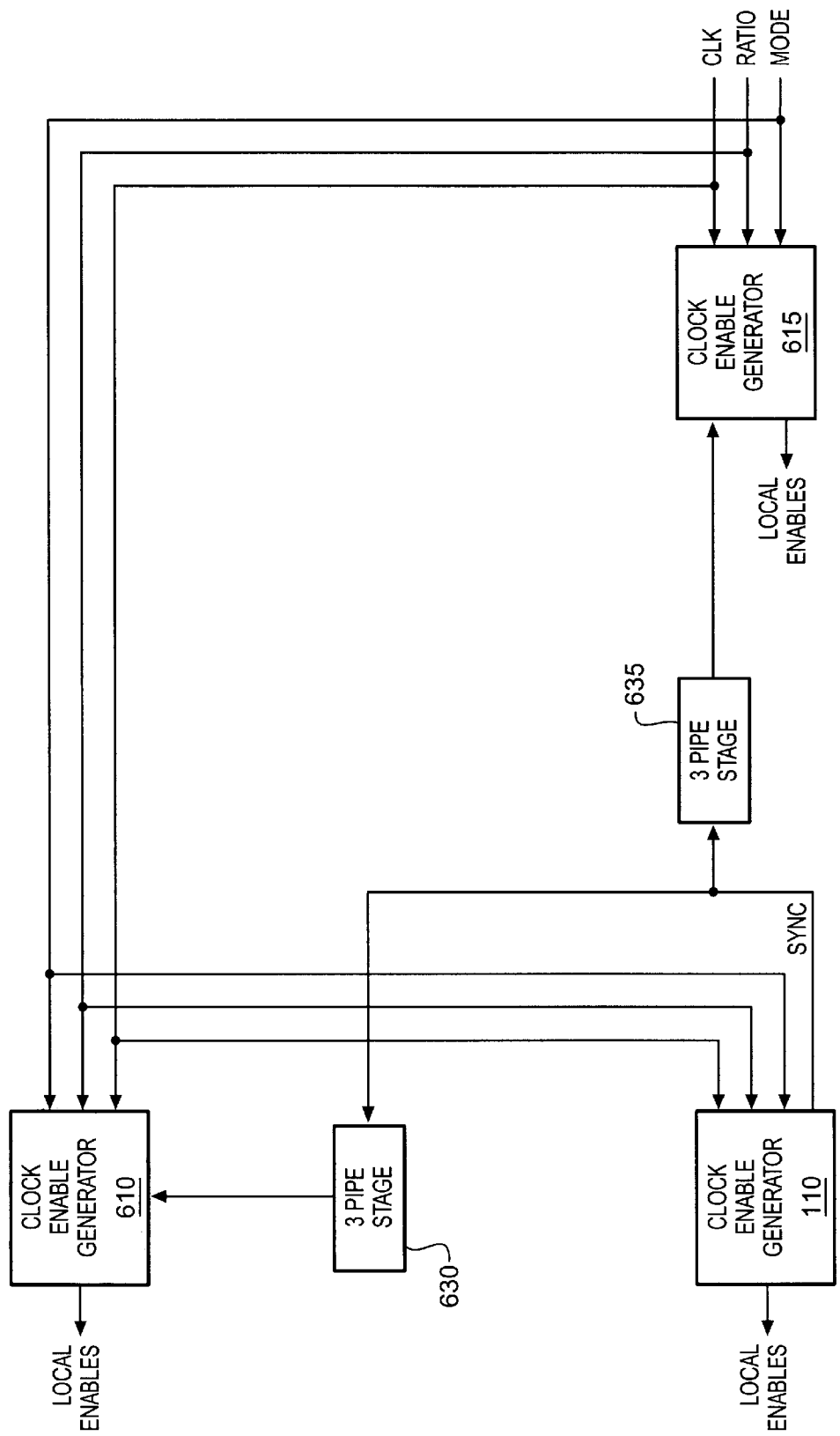
FIG. 6 illustrates a block diagram of an embodiment of microprocessor 100.

According to one embodiment, clock enables may be generated local to each of the control, data and address busses. In such an embodiment, a clock enable generator is positioned in close proximity to each bus. FIG. 6 illustrates a block diagram of an embodiment of microprocessor 100 wherein all clock enable are generated local to each bus. Microprocessor 100 includes clock enable generators 110, 610 and 615, 3-pipe stage 630 and 3-pipe stage 635. 3-pipe stages 630 and 635 represent three clock cycles in which it takes to route, distribute and repeat a SYNC signal generated by clock enable generator 110. The SYNC signal is necessary to ensure that each clock enable generator generates enables that are synchronized with the others.

Figure 7:
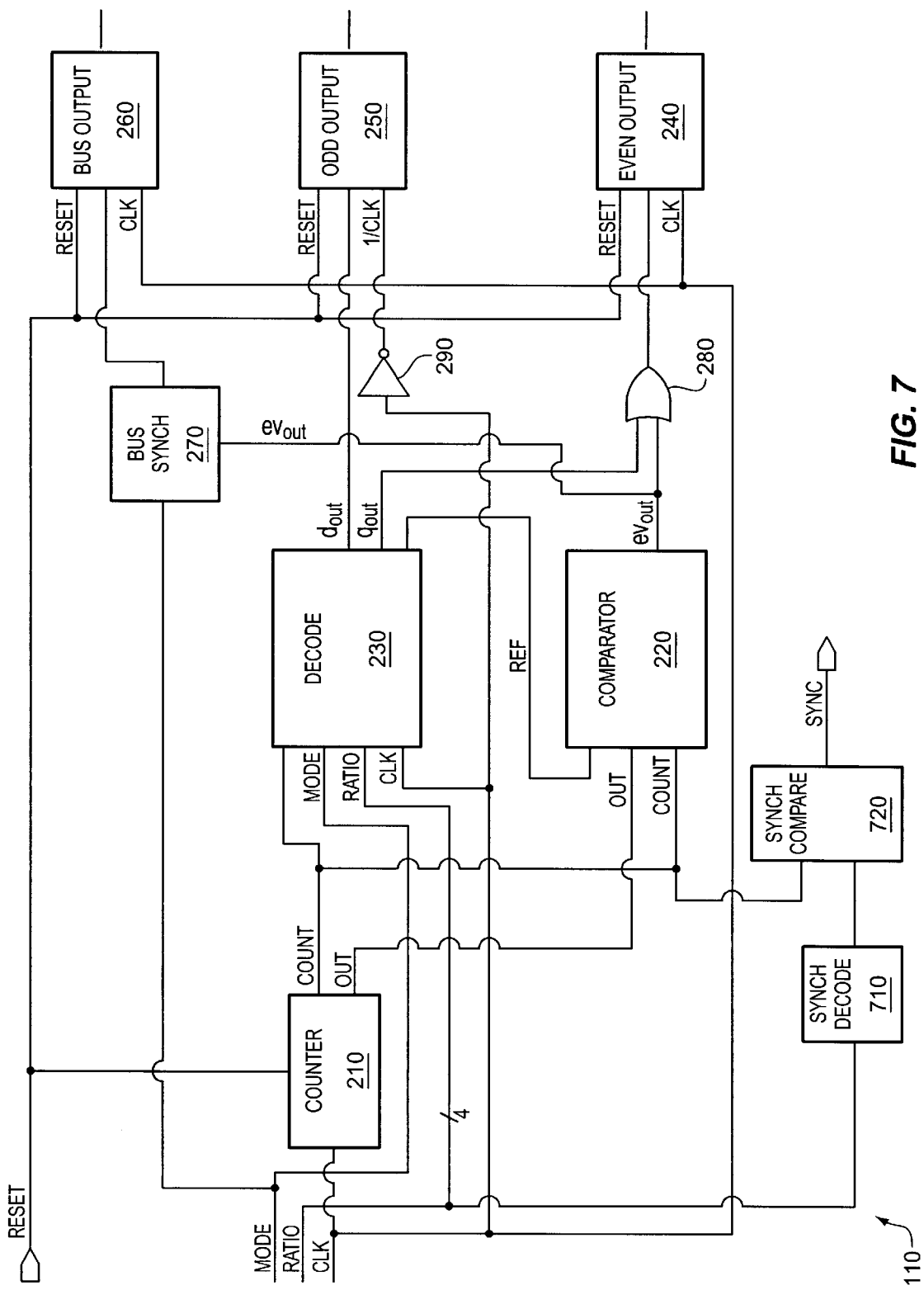
FIG. 7 illustrates an embodiment of a clock enable generator according to the present invention.

FIG. 7 illustrates an alternative embodiment of clock enable generator 110 according to the present invention. Referring to FIG. 7, a synch decode module 710 and a synch comparator has been added to the circuit described in FIG. 2. Synch decode module 710 receives the RATIO signal as an input and transmits a PRESYNC. PRESYNC is produced by subtracting three from the RATIO signal. If RATIO=8, for example, PRESYNC=5. Synch decode module is implemented using an eight bit adder/subtracter. However, in alternative embodiments, other circuitry may be used to perform the functionality of Synch decode module 710.

Synch comparator 720 receives the PRESYNC signal from synch decode module 710 and the COUNT signal from counter 210. Once a match is detected between the COUNT and PRESYNC signals, the SYNC signal is transmitted to 3-pipe stage 630 and 3-pipe stage 635.

According to one embodiment, clock enable generator 110 is located near the control bus and functions as the master clock enable generator. As discussed above, clock enable generator 110 receives the CLK, RATIO and MODE signals. Clock enable generator 110 generates the control clock enable using bus synch module 270 and bus output 260. Even output module 240 and odd output module 250 are disabled such that other clock enables are not generated.

Clock enable generator 610 is located near the address bus and is coupled to clock enable generator 110 via 3-pipe stage 630. Clock enable generator 610 also receives the CLK, RATIO and MODE signals. Clock enable generator 610 generates the address clock enable in a manner similar to the generation of the control clock enable if microprocessor 100 is operating in the double mode (i.e., via bus synch module 270 and bus output 260). If operating in the quad mode, the clock enable generator generates the address bus using even output module 240 and odd output module 250 (i.e., 2×control clock). Bus synch module 270 and bus output 260 are disabled so that the control clock enable is not generated.

Clock enable generator 615 is located near the data bus and is coupled to clock enable generator 110 via 3-pipe stage 635. Clock enable generator 615 also receives the CLK, RATIO and MODE signals. Clock enable generator 615 generates the data clock enable using even output 240 and odd output 250 (i.e., 2×and 4×control block). Bus synch module 270 and bus output 260 are disabled so that the control clock enable is not generated. In an alternative embodiment, logic that is not necessary to produce the pertinent clock enable (e.g., bus synch module 270 and bus output 260 for data clock enable generation) is not included within the clock enable generator in order to preserve space within microprocessor 100. Thus, local generation of enable signals avoids unnecessary logic.

Local enable generation avoids having to route enable signals across microprocessor 100 to each bus. Enable signals typically switch at fairly high frequencies. High frequency switching signals that must be distributed along long global lines consume a considerable amount of power and may create cross talk (noise couple into other signals in close proximity to the enable signal, or other signals couple noise into the enable signals). Crosstalk may cause a change in timing or induce false enable pulses. By avoiding the need to globally route enable signals, power is saved and cross talk is eliminated since it is not necessary to distribute high frequency switching signals along long global lines.

Thus, an apparatus for generating and distributing bus clock enable signals in a microprocessor has been described.

What is claimed is:

1. A clock enable generator circuit, comprising:
   a decode module for generating enable pulses in response to a received clock ratio signal;
   a first output circuit coupled to the decode module for generating a first set of clock enables; and
   a second output circuit coupled to the decode module for generating the first set of clock enables;
   the first output circuit generates the first set of clock enables in response to the clock enable generator circuit receiving an even ratio signal, and the first and second output circuits generate the first set of clock enables in response to the clock enable generator circuit receiving an odd ratio signal.

2. The clock enable generator circuit of claim 1 further comprising a third output circuit coupled to the decode module for generating a second set of clock enables.

3. The clock enable generator circuit of claim 1, wherein the clock enable generator circuit is further configured to operate in either a first mode or second mode.

4. The clock enable generator circuit of claim 3 wherein the frequency of the first set of clock enables is twice the frequency of the second set of clock enables while the clock enable generator circuit is operating in the first mode.

5. The clock enable generator circuit of claim 3 wherein the frequency of the first clock enable is four times the frequency of the second clock enable while the clock enable generator circuit is operating in the second mode.

6. The clock enable generator circuit of claim 2 further comprising:
   a counter coupled to the decode module; and
   a first comparator coupled to the decode module and the counter.

7. The clock enable generator circuit of claim 1 wherein the decode module further comprises:
   a second comparator; and
   a plurality of logical shift units coupled to the second comparator.

8. A computer system, comprising:
   a first clock enable generator coupled to a system bus, said first clock enable generator for generating a first set of enable signals for synchronization of a first portion of said system bus, wherein the first set of enable signals are generated based upon a first ratio signal received at the first clock enable generator; and
   a second clock enable generator coupled to the system bus, said second clock enable generator for generating a second set of enable signals for synchronization of a second portion of said system bus, wherein the second set of enable signals are generated based upon a second ratio signal received at the second clock enable generator.

9. The system of claim 8 wherein said first portion of said system bus is an address portion and said second portion is a control portion.

10. The system of claim 8 further comprising a third clock enable generator coupled to said system bus, said third clock enable generator for generating a third set of enable signals for synchronization of a third portion of said system bus.

11. The system of claim 10 wherein said first portion of said system bus is a data portion, said second portion is an address portion and said third portion of said system bus is a control portion.

12. The system of claim 10 wherein said first clock enable generator comprises synchronization circuitry, said synchronization circuitry for generating synchronization signals that are distributed to said second and third clock enable generators.

13. The system of claim 12 wherein said synchronization signals are distributed to said second and third clock enable generators in a three-pipe stage.

14. A method of generating clock enable signals, the method comprising:

receiving a first input signal at a clock generator, wherein the first input signal indicates a first frequency at which clock enable signals are generated;

receiving a second input signal at the clock generator, wherein the second signal indicates whether the clock generator is operating in a first mode or second mode of operation, wherein clock enable signals are generated at a second frequency whenever the second signal indicates the first mode of operation and wherein clock enable signals are generated at a third frequency whenever the second signal indicates the second mode of operation;

processing the first input signal into reference signals;

receiving a core clock pulse at a counting circuit;

incrementing a count variable;

comparing the count variable with the reference signals; and transmitting a clock enable signal upon a match between the count variable and one of the reference signals.

15. The method of claim 14 wherein the step of processing the first input signal into reference signals further comprises the steps of:

transmitting the first input signal to a first multiplexer;

transmitting the first input signal to a first shift circuit;

shifting the first input signal to form a first shift value;

transmitting the first shift value to the first multiplexer; and transmitting a first reference signal from the first multiplexer.

16. The method of claim 15 further comprising a step of selecting the first shift value or the first input signal to be transmitted from the first multiplexer as the first reference signal, wherein the first input signal is selected if the first input signal is odd and the first shift value is selected if the first input signal is even.

17. The method of claim 15 wherein the step of processing the first input signal into reference signals further comprises the steps of:

transmitting the first shift value to a second multiplexer;

transmitting the first shift value to a second shift circuit;

shifting the first shift value to form a second shift value;

transmitting the second shift value to the second multiplexer; and transmitting a second reference signal from the second multiplexer.

18. The system of claim 17 further comprising a step of selecting the first shift value or the second shift value to be transmitted from the second multiplexer as the second reference signal, wherein the first shift value is selected if the circuit is operating in the first mode and the second shift value is selected if the circuit is operating in the second mode.

19. The method of claim 14, wherein the step of transmitting an enable signal further comprises the steps of:

transmitting an enable pulse to output circuitry;

transmitting the enable pulse to synchronization circuitry;

transmitting a first bus enable signal from the output circuitry; and transmitting a second bus enable signal from the synchronization circuitry.

20. The method of claim 14, wherein the step comparing the count variable with the reference signals further comprises comparing the count variable with the first reference signal at a first comparator and comparing the count variable with the second reference signal at a second comparator.

* * * * *